(12) United States Patent
Ye et al.

(10) Patent No.: US 11,644,617 B1
(45) Date of Patent: May 9, 2023

(54) SYSTEMS HAVING FIBERS WITH ANTIREFLECTION COATINGS

(71) Applicant: Apple Inc., Cupertino, CA (US)

(72) Inventors: Shenglin Ye, Santa Clara, CA (US); Wei Lin, Santa Clara, CA (US); Prabhakar Gulgunje, Cupertino, CA (US); Shubhaditya Majumdar, Santa Clara, CA (US); Boyi Fu, San Jose, CA (US); Sudirukkuge T. Jinasundera, San Jose, CA (US); Nathan K. Gupta, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/408,300

(22) Filed: Aug. 20, 2021

Related U.S. Application Data

(60) Provisional application No. 63/081,793, filed on Sep. 22, 2020.

(51) Int. Cl.
  *G02B 6/04* (2006.01)
  *G02B 6/10* (2006.01)
(52) U.S. Cl.
  CPC ............. *G02B 6/04* (2013.01); *G02B 6/102* (2013.01)
(58) Field of Classification Search
  CPC .................................. G02B 6/04; G02B 6/102
  USPC ........................................................ 385/115
  See application file for complete search history.

(56) References Cited

U.S. PATENT DOCUMENTS

| | | | |
|---|---|---|---|
| 6,174,424 B1* | 1/2001 | Wach | G02B 6/4203 205/79 |
| 6,636,686 B1* | 10/2003 | Belfer | G02B 6/04 385/115 |
| 6,777,083 B1* | 8/2004 | Mizota | C08F 2/02 428/394 |
| 7,773,849 B2 | 8/2010 | Shani | |
| 7,839,902 B2 | 11/2010 | Li et al. | |
| 8,116,003 B1 | 2/2012 | Wach | |
| 8,854,728 B1 | 10/2014 | Brooks et al. | |
| 2015/0053641 A1 | 2/2015 | Zaccarin et al. | |
| 2016/0015467 A1 | 1/2016 | Vayser et al. | |

* cited by examiner

*Primary Examiner* — Jerry M Blevins
(74) *Attorney, Agent, or Firm* — Treyz Law Group, P.C.; G. Victor Treyz; Tianyi He

(57) ABSTRACT

A system may include one or more electronic devices. Fiber bundles may be provided to convey light. A fiber bundle may have a bend along its length. Fibers for the fiber bundle may be formed from polymer cores coated with polymer claddings. The fibers may have end faces coated with antireflection coatings. The antireflection coatings may be formed from amorphous fluoropolymer deposited from solution. The fluoropolymer may be applied to the end faces of the fibers by dipping, spraying, or by dispensing with a needle dispenser or other dispensing tool. An optical component such as a light-emitting device for a communications system, an illumination system, or a sensor system may provide infrared light that is guided through the fiber bundle.

20 Claims, 4 Drawing Sheets

US 11,644,617 B1

SYSTEMS HAVING FIBERS WITH ANTIREFLECTION COATINGS

This application claims the benefit of provisional patent application No. 63/081,793, filed Sep. 22, 2020, which is hereby incorporated by reference herein in its entirety.

FIELD

This relates generally to fibers, and, more particularly, to systems with optical fibers.

BACKGROUND

Optical fibers are used to transport light. Light reflections at fiber surfaces and other fiber characteristics can hinder performance.

SUMMARY

A system may include one or more electronic devices. Fiber bundles may be provided to convey light. As an example, a fiber bundle may convey light that is supplied by a light emitting device such as an infrared light-emitting diode or laser.

A fiber bundle may have a bend along its length. Fibers for the fiber bundle may be formed from polymer cores coated with polymer claddings. The fibers may have end faces coated with antireflection coatings.

Fiber end face antireflection coatings may be formed from a solution-deposited amorphous fluoropolymer. The fluoropolymer may be applied to the end faces of the fibers by dipping, by spraying, or by dispensing in a needle dispenser or other dispensing tool. An optical component such as a light-emitting device for a communications system, an illumination system, or a sensor system may provide infrared light that is guided through the fiber bundle.

DETAILED DESCRIPTION

Optical fibers may serve as light guides that convey light in accordance with the principal of total internal reflection. To help enable high levels transmission through the optical fibers, the end faces of the optical fibers may be coated with antireflection coatings. In an illustrative configuration, which is described herein as an example, optical fibers are formed from polymer and the antireflection coatings on the end faces are formed from polymer. The optical fibers may be used individually or in bundles. As an example, a fiber bundle may be formed that contains 10-50 fibers or other suitable number of fibers.

Optical fibers may be used in systems to convey optical communications data, to convey light that is used as illumination for objects, to convey light for a sensor, or to otherwise convey light between different locations. In some configurations, optical fibers are bent so that light is directed in a desired direction and/or so that light passes around obstructions.

Figure 1:
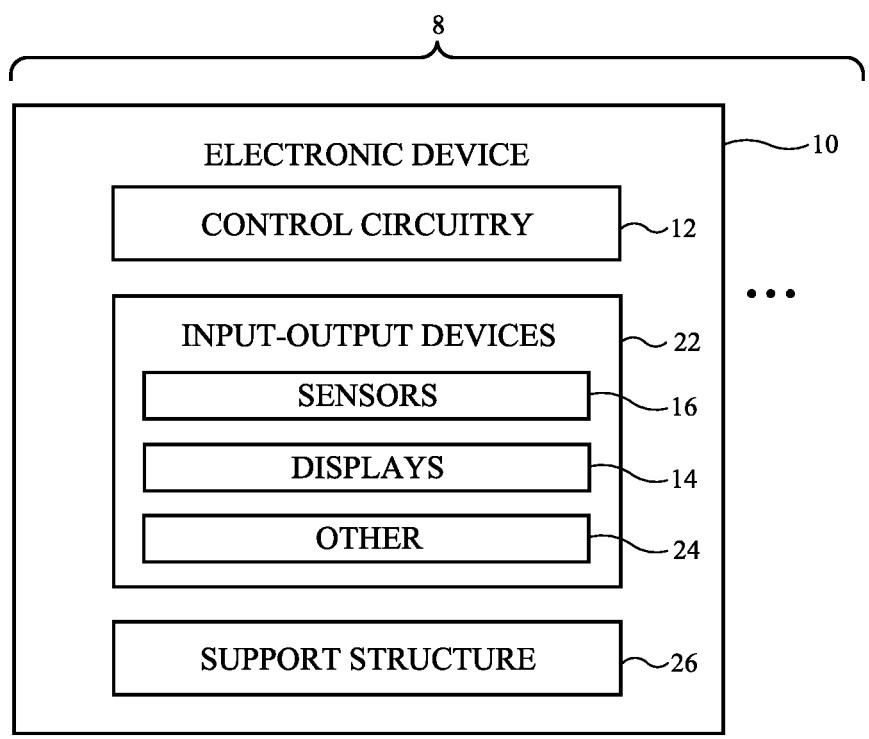
FIG. 1 is a schematic diagram of an illustrative system with optical fibers in accordance with an embodiment.

A schematic diagram of an illustrative system that may include optical fibers is shown in FIG. 1. As shown in FIG. 1, system 8 may have one or more electronic devices 10. Devices 10 may include head-mounted devices, accessories such as headphones, keyboards, removable covers, straps and other components that are removably attached to head-mounted devices or other electronic devices, cellular telephones, tablet computers, laptop computers, desktop computer, wristwatches, and/or other devices. Optical fibers may be used to convey light between devices 10 and/or may be used within individual devices 10.

Each electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, near-field communications circuitry, and/or other wireless communications circuitry. Circuitry 12 may also include optical communications circuitry.

To support interactions with external equipment, control circuitry 12 may be used in implementing communications protocols. Communications protocols that may be implemented using control circuitry 12 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, multiple-input and multiple-output (MIMO) protocols, antenna diversity protocols, satellite navigation system protocols such as global positioning system (GPS) protocols and global navigation satellite system (GLONASS) protocols, IEEE 802.15.4 ultra-wideband communications protocols or other ultra-wideband communications protocols, near-field communications protocols, etc.

During operation, the communications circuitry of the devices in system 8 (e.g., the communications circuitry of control circuitry 12 of device 10) may be used to support communication between the electronic devices. For example, one electronic device may transmit video data, audio data, sensor data, control commands, and/or other data to another electronic device in system 8. In general, electronic devices in system 8 may use wireless communications circuitry, may use optical communications, and/or communications through electrically wired connections to communicate directly between devices and/or through one or more communications networks (e.g., the internet, local area networks, etc.). The communications circuitry may be used to allow data to be received by device 10 from external equipment (e.g., a tethered computer, a portable device such as a handheld device or laptop computer, an accessory, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as displays 14. During operation, displays 14 may be used to display visual content for a user of device 10.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional light detection and ranging sensors, sometimes referred to as lidar sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes, lasers, and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have support structures such as support structure 26. Structure 26 may form a housing for a portable electronic device or other electronic device, a head-mounted support structure for a head-mounted device, a housing for an accessory, portions of a cover or case, portions of a strap, portions of a system in which some or all of the circuitry of FIG. 1 is embedded, and/or other suitable supporting structures for the components of FIG. 1.

Figure 2:
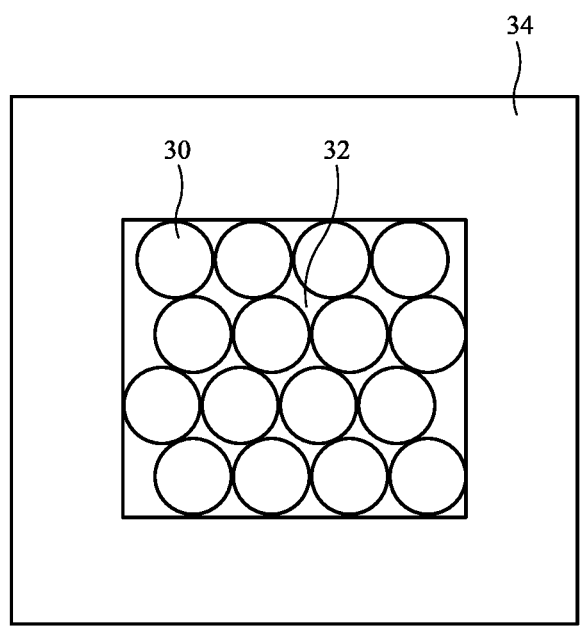
FIG. 2 is a side view of a bundle of fibers in accordance with an embodiment.

System 8 may include one or more optical fibers. These fibers may be located in one or more devices 10 and may be used for transporting light associated with communications, illumination, sensing, and/or other functions. In some configurations, fibers may be organized in bundles such as the illustrative fiber bundle of FIG. 2. As shown in the cross-sectional view of fibers 30 of FIG. 2, a bundle of fibers 30 may optionally be mounted in a fiber bundle support structure such as fiber bundle housing 34. There may be any suitable number of fibers 30 in a fiber bundle of the type shown in FIG. 2 (e.g. at least 5, at least 10, at least 20, fewer than 200, fewer than 100, fewer than 50, fewer than 25, 5-100, 2-200, 10-50, or other suitable number).

Housing 34 may be formed from polymer, metal, and/or other materials. In some configurations, polymer adhesive or other polymer may be placed around the fibers at one or both ends of the fibers (while leaving the fiber end faces uncovered). The polymer adhesive may help hold the fibers of the fiber bundle in place. When fibers 30 are secured in this way and/or when other fiber mounting techniques are used, housing 34 or part of housing 34 may be omitted.

Air may fill the interstitial spaces between adjacent fibers 30 or gaps 32 between fibers 30 may be filled with polymer or other material. When air is present in the spaces between fibers 30, a relatively large refractive index difference will exist between fibers 30 and the surrounding air, which may help with light confinement within fibers 30.

Figure 3:
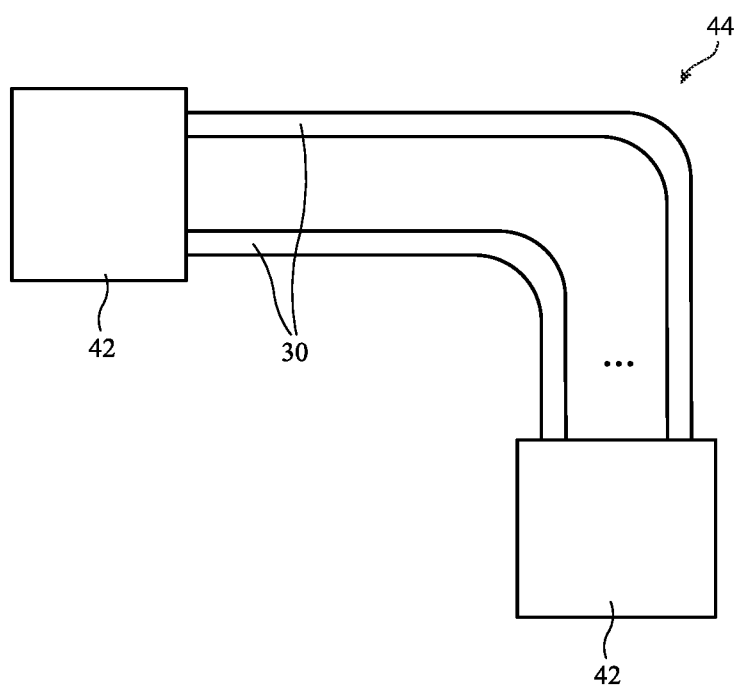
FIG. 3 is a side view of a bundle of bent fibers in accordance with an embodiment.

As shown in FIG. 3, the fiber bundle formed from fibers 30 may, if desired, be bent at one or more locations along its length. Each fiber 30 may, as an example, have one or more bends 44 characterized by a bend radius of 1-3 mm, 0.5-3 mm, 0.5-1 mm, at least 0.3 mm, less than 4 mm, less than 3 mm, less than 2 mm, less than 1.5 mm, less than 1 mm, or less than 0.7 mm (as examples). When fibers 30 are bent, there is an enhanced risk that some of the light being guided within fibers 30 will escape, thereby reducing the end-to-end transmission of light through fibers 30. Providing antireflection coatings on the end faces of fibers 30 helps to enhance light coupling into and out of fibers 30, thereby helping to recover light losses due to fiber bending.

As demonstrated by the example of FIG. 3, the end faces of fibers 30 may be optically coupled to adjacent components at one or both ends of the fiber bundle such as illustrative components 40 and 42. These components may include optical components that emit light and/or that detect light. Light associated with the optical components may be guided through fibers 30. The light may be ultraviolet light (e.g., light at a wavelength of less than 380 nm), may be visible light (e.g., light at visible light wavelengths of 380 nm to 740 nm), and/or may be infrared light (e.g., near infrared light at a wavelength of 740 nm-1.4 microns and/or infrared light having a wavelength of 800-1500 nm, 800-1000 nm, 900-1000 nm, at least 800 nm, at least 850 nm, at least 900 nm, 940 nm, at least 1000 nm, less than 2000 nm, less than 1500 nm, less than 1400 nm, less than 1300 nm, less than 1200 nm, less than 1000 nm, 800-1300 nm, or other suitable infrared wavelengths). A light-emitting component coupled to fibers 30 may have a single light-emitting device (e.g., a semiconductor light-emitting device such as a light-emitting diode or laser diode) or may have a collection of multiple light-emitting devices. In some configurations, a light-emitting component may have pixels and may display images. Light-sensing components may have single light-detecting devices (e.g., a semiconductor photodetector that senses ultraviolet light, visible light, and/or infrared light), may have multiple photodetectors (e.g., photodetectors configured to detect light in different bands of wavelengths), and/or may have light sensor pixels (e.g., light sensing pixels in an image sensor).

When used for communication, one device (e.g., component 40 of FIG. 3, which may be a transmitter containing a light source such as a light-emitting diode or laser) may transmit optical data signals through fiber(s) 30 and another device (e.g., component 42, which may be a receiver having a photodetector) may receive the transmitted optical data signals after the transmitted optical data signals have passed through fiber(s) 30). The transmitter and receiver in this type of arrangement may be located in the same electronic device or the transmitter may be located in a first device in system 8 while the receiver is located in a second device in system 8.

When used as a source of illumination, component 42 may be omitted (as an example). Light may be provided to a first end of fiber(s) 30 by a light-emitting device in component 42 (e.g. a light-emitting diode or laser). After being guided along fiber(s) 30, this light may be emitted from an opposing second end of fiber(s) 30.

In other configurations, component 40 and/or component 42 may each be optical sensor components that emit and/or detect light (e.g., image sensors, optical proximity sensors, ambient light sensors, etc.). Arrangements may also be used in which fibers 30 receive light from displays and other light sources (e.g., configurations in which component 40 is a display or is a light-emitting diode or laser that serves as a status indicator light). In some arrangements, fibers may be coupled in series. For example, one or more additional lengths of fiber may be interposed between the ends of fibers 30 and component 42. The configuration of FIG. 3 in which components 40 and 42 are directly optically coupled to fibers 30 (e.g., with only a small air gap between each component and an opposing fiber end face) is described herein as an example.

Figure 4:
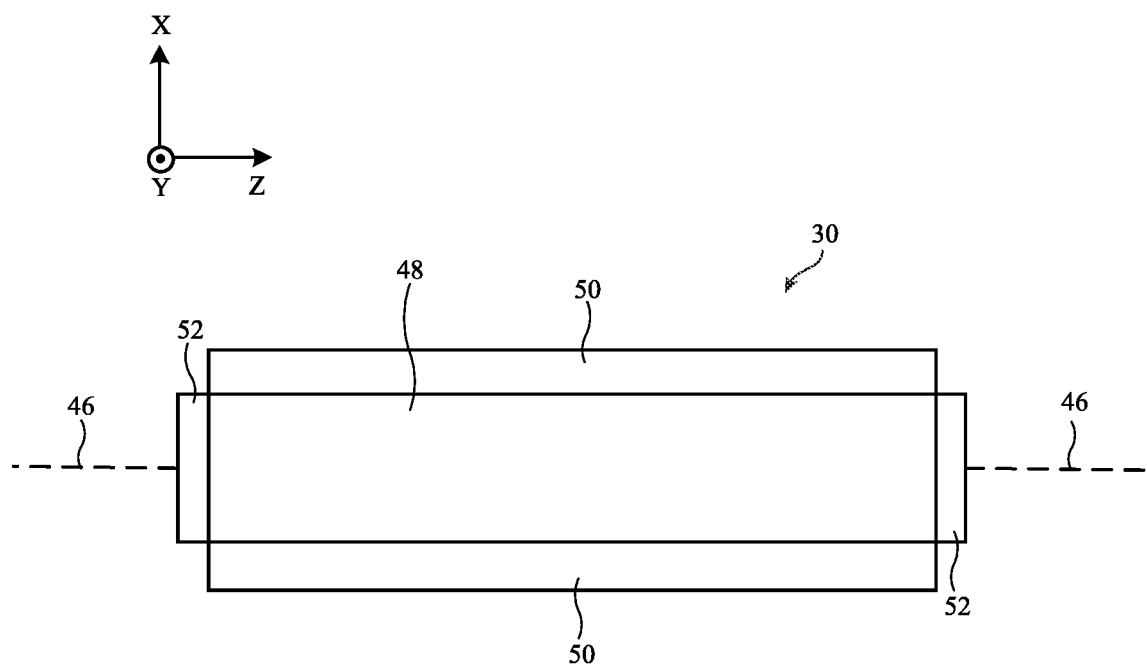
FIG. 4 is a side view of an illustrative optical fiber with end faces coated with antireflection coatings in accordance with an embodiment.

A cross-sectional side view of an illustrative fiber is shown in FIG. 4. As shown in FIG. 4, fiber 30 may be characterized by a longitudinal axis such as axis 46. The length of fiber 30 along axis 46 (whether straight or whether fiber 30 has one or more bends such as bend 44 of FIG. 3) may be at least 1 mm, at least 3 mm, at least 5 mm, 10 mm, less than 50 mm, less than 20 mm, 3-30 mm, 1-50 mm, or other suitable length. There may be any suitable number of fibers such as fiber 30 that are joined together (e.g., using a support structure such as structure 34 of FIG. 2, using polymer binder in some or all of interstitial spaces 32 of FIG. 2, etc.).

Fiber 30 may have a core such as core 48 (e.g., an elongated core such as an elongated cylindrical core) surrounded by a cladding layer such as cladding 50. The diameter of core 48 may be 125 microns, 100 microns, at least 20 microns, at least 40 microns, at least 75 microns, at least 100 microns, less than 600 microns, less than 400 microns, less than 300 microns, less than 250 microns, less than 175 microns, less than 100 microns, 25-600 microns, 40-300 microns, or other suitable diameter.

Cladding 50 may have a thickness of 4 microns, 2-6 microns, 1-16 microns, 2-8 microns, at least 1 micron, at least 2.5 microns, at least 4 microns, less than 25 microns, less than 20 microns, less than 12 microns, less than 8 microns, or other suitable thickness. There may be a single cladding layer or multiple cladding layers on core 48 and there may, if desired, be optional additional materials on fiber 30 such as binder materials, protective outer layer(s), etc.

The end faces of fiber 30 may be covered with antireflection coating layers such as antireflection coatings 52. Coatings 52 may have thicknesses of 1-10 microns, 0.5-20 microns, 0.2-40 microns, at least 0.1 microns, at least 0.3 microns, at least 0.8 microns, at least 2 microns, at least 5 microns, at least 10 microns, less than 40 microns, 1-40 microns, less than 50 microns, less than 25 microns, less than 20 microns, less than 10 microns, or other suitable coating thickness. Coatings 52 may each be formed from a single layer of material or may be formed from a stack of multiple layers. Configurations in which each coating 52 is formed from a single layer of material deposited on a respective end face of fiber 30 may sometimes be described herein as an example.

Cladding 50 and antireflection coatings 52 are preferably formed from material with a lower refractive index than core 48. The lower refractive index of cladding 50 relative to core 48 promotes light guiding within fiber 30 in accordance with the principal of total internal reflection. The lower refractive index of coatings 52 relative to core 48 allows coatings 52 to lower the refractive index difference experienced at the air interface at each end face. This helps to reduce Fresnel reflections at the end faces and thereby enhance the overall transmission from one end of the fiber to the other. In an illustrative configuration, the overall transmission of fiber 30 is at least 90%, at least 91%, at least 92%, at least 94%, at least 95%, less than 99%, 90-94%, or other suitable value. The inclusion of antireflection coatings 52 may enhance transmission relative to fibers with uncoated end faces by at least 1%, at least 1.5%, or other suitable amount.

The index difference between core 48 and cladding 50 (and between core 48 and coatings 52) may be, for example, at least 0.03, at least 0.06, at least 0.1, less than 0.4, less than 0.2 or other suitable index difference. If desired, cladding 50 and coatings 52 may be formed from the same material. Illustrative arrangements in which cladding 50 and coatings 52 are formed separately (e.g., from different materials) may sometimes be described herein as examples.

Core 48, cladding 50, and coatings 52 may be formed from transparent materials such as glass, ceramic, crystalline material such as sapphire, and/or other materials such as polymer materials. In an illustrative arrangement, core 48, cladding 50, and coatings 52 are polymers. The use of polymer coating layers on the end faces of core 48 may help prevent damage to the end faces that inorganic coating layers could create. The use of polymer cladding on core 48 may help avoid cracking issues that might arise using inorganic cladding layers on bent fibers. Polymer fiber cores may be formed by extrusion, injection molding or other molding techniques, drawing techniques, and/or other fiber core formation techniques. Cladding 50 may be formed on core 48 during core formation (e.g., when fibers 30 are extruded) or may be formed by depositing a coating on a completed core.

Any suitable polymers may be used in forming core 48, cladding 50, and antireflection coatings 52. These polymers may include, for example, polyethylene terephthalate, polystyrene, polymethyl methacrylate, polycarbonate, polyester, or polyvinylidene fluoride or other fluoropolymers (e.g., low-refractive-index fluoropolymers). In an illustrative configuration, core 48 is formed from a polymer having a refractive index of about 1.48-1.49 (e.g., polymethyl methacrylate) and cladding 50 is formed from an amorphous fluoropolymer such as polyvinylidene fluoride. Other polymers may be used, if desired.

Coating 52 may be formed from a polymer that is applied to the end faces of fiber 30 in solution. As an example, coating 52 may be formed from a fluoropolymer (e.g., a fluoropolymer that is free of C—H bonds) that is dissolved in a fluorine-based solvent. Coating 52 may be formed on the ends of fibers 30 by dipping fibers 30 into a fluoropolymer solution, by spraying the fluoropolymer solution onto the ends of fibers 30, by dispensing fluoropolymer solution onto the ends of fibers 30 using a needle dispenser, jet dispenser, or other liquid dispensing tool, and/or by otherwise exposing the end faces of core 48 to the fluoropolymer solution. The dispensed solution may be air dried and/or thermally cured (e.g., by applying heat from a heater) to form a solid layer of amorphous fluoropolymer on each end face of core 48 and fiber 30. By using a solution-processed polymer (e.g., a solution-processable fluoropolymer) to form antireflection coatings 52, processing operations can be simplified and damage that might otherwise arise in depositing a dielectric coating such as an inorganic dielectric coating to the fiber end faces can be avoided. The solution-processed amorphous fluoropolymer layer may be configured to exhibit low light absorption over wavelengths of interest (e.g., the polymer may be free of C—H bonds to help enhance transmission at 800-1300 nm, 900-1000 nm, other infrared wavelengths, and/or other wavelengths of interest).

Following formation of coatings 52 on fibers 30, fibers 30 can be assembled to form a bundle and may, if desired, be mounted adjacent to one or more components (e.g., component 40 and/or component 42 of FIG. 3). During operation of system 8, fibers 30 may convey light from one end of fibers 30 to another. For example, in scenarios in which component 40 is an infrared light-emitting diodes or laser, component 40 may emit light that is coupled via a first antireflection coating 52 into a first end of one or more fibers 30 and this light, following guiding along the length of fibers 30, may be emitted out of the opposing second end of the fiber(s) through a second antireflection coating 52. The presence of antireflection coatings 52 (e.g., solution-processed amorphous fluoropolymer coatings) on the end faces of the fibers helps reduce air-polymer interface reflections and thereby increases light transmission through the fibers.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A system, comprising:
a light-emitting component configured to emit infrared light; and
a fiber comprising a polymer core, a polymer cladding, and a polymer antireflection coating on first and second opposing end faces of the fiber, wherein the first end face of the fiber is configured to receive the emitted infrared light and wherein the fiber is configured to convey the received infrared light from the first end face of the fiber to the second end face of the fiber.

2. The system defined in claim 1 further comprising:
additional fibers bundled with the fiber to form a fiber bundle, wherein each fiber in the fiber bundle has an end face covered with the polymer antireflection coating.

3. The system defined in claim 2 wherein the polymer antireflection coating comprises a solution-processed polymer coating.

4. The system defined in claim 3 wherein the polymer antireflection coating comprises a solution-processed amorphous fluoropolymer.

5. The system defined in claim 4 wherein the fiber bundle has a bend.

6. The system defined in claim 5 wherein the bend has a bend radius of 0.5-2 mm.

7. The system defined in claim 6 wherein the polymer core has a diameter of 40-300 microns.

8. The system defined in claim 7 wherein the light-emitting component is configured to emit the infrared light at a wavelength of 900-1000 nm.

9. The system defined in claim 8 wherein the polymer cladding has a thickness of 2-8 microns.

10. The system defined in claim 9 wherein the polymer antireflection coating has a thickness of 0.2-40 microns.

11. The system defined in claim 10 wherein the fiber bundle has 10-50 fibers.

12. The system defined in claim 1 wherein the polymer antireflection coating comprises an amorphous fluoropolymer.

13. The system defined in claim 12 wherein the polymer antireflection coating has a thickness 0.2-40 microns on each end face.

14. The system defined in claim 13 wherein the polymer cladding and the polymer antireflection coating each have a refractive index value lower than the polymer core.

15. A fiber bundle comprising:
polymer fibers, each having a fiber core formed from a core polymer with a core polymer refractive index, a cladding formed from a cladding polymer with a cladding refractive index that is lower than the core polymer refractive index, and an amorphous polymer antireflection coating on opposing end faces of each of the polymer fibers.

16. The fiber bundle defined in claim 15 wherein the amorphous polymer antireflection coating comprises an amorphous fluoropolymer.

17. The fiber bundle defined in claim 16 wherein the amorphous polymer antireflection coating has a thickness of 1-10 microns.

18. A system comprising:
an infrared light-emitting device configured to emit light at a wavelength of 900-1000 nm; and
a fiber bundle with a bend that is configured to receive the emitted light and to convey the emitted light by total internal reflection within the fiber bundle, wherein the fiber bundle includes polymer fibers that each include an end face coated with a polymer antireflection coating and wherein the light emitted by the infrared light-emitting device is configured to pass through the polymer antireflection coating at the end face of each of the polymer fibers.

19. The system defined in claim 18 wherein the polymer antireflection coating comprises an amorphous fluoropolymer.

20. The system defined in claim 19 wherein there are air gaps between at least some of the polymer fibers in the fiber bundle.

* * * * *